United States Patent
Lee et al.

(10) Patent No.: US 9,899,882 B2
(45) Date of Patent: Feb. 20, 2018

(54) WIRELESS POWER PEER TO PEER COMMUNICATION

(75) Inventors: Kevin D. Lee, San Diego, CA (US); Zhen Ning Low, San Diego, CA (US); Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 901 days.

(21) Appl. No.: 13/273,074

(22) Filed: Oct. 13, 2011

(65) Prior Publication Data

US 2012/0153742 A1     Jun. 21, 2012

Related U.S. Application Data

(60) Provisional application No. 61/425,202, filed on Dec. 20, 2010.

(51) Int. Cl.
*H01F 27/42*     (2006.01)
*H02J 50/80*     (2016.01)
(Continued)

(52) U.S. Cl.
CPC .......... *H02J 50/80* (2016.02); *G06K 19/0701* (2013.01); *H02J 7/025* (2013.01);
(Continued)

(58) Field of Classification Search
CPC . H01F 2/42; H01F 37/00; H01F 38/00; H01F 27/42; H01F 38/14; H01F 27/006;
(Continued)

(56) References Cited

U.S. PATENT DOCUMENTS 6,253,090 B1 *   6/2001   Nobbs ........................ 455/500
6,427,065 B1 *   7/2002   Suga ..................... G06K 7/0008
                                                                 235/492

(Continued)

FOREIGN PATENT DOCUMENTS

EP        0829940 A2 *   3/1998           G06K 7/0008
EP        0829940 A2     3/1998
(Continued)

OTHER PUBLICATIONS

Yu H, et al., "A Multi-Channel Instrumentation System for Biosignal Recording," Engineering in Medicine and Biology Society, 2008, EMBS 2008. 30th Annual International Conference of the IEEE, IEEE, Piscataway, NJ, USA, Aug. 20, 2008 (Aug. 20, 2008), pp. 2020-2023, DOI:10.1109/IEMBS.2008.4649587, ISBN:978-1-4244-1814-5.

(Continued)

*Primary Examiner* — Rexford Barnie
*Assistant Examiner* — Joseph Inge
(74) *Attorney, Agent, or Firm* — Knobbe, Martens, Olson & Bear, LLP

(57) ABSTRACT

Exemplary embodiments are directed to wireless power communication. In one aspect a wireless power receiver configured to receive wireless power from a wireless power transmitter is provided. The wireless power receiver includes a switchable element configured to couple a receive coil to a ground voltage. The wireless power receiver further includes a detector coupled to the receive coil and configured to detect an externally generated pulse.

27 Claims, 10 Drawing Sheets

(51) Int. Cl.
  *H02J 50/12*     (2016.01)
  *H02J 7/02*      (2016.01)
  *H02J 50/40*     (2016.01)
  *G06K 19/07*     (2006.01)
  *H02J 17/00*     (2006.01)
(52) U.S. Cl.
  CPC .............. *H02J 17/00* (2013.01); *H02J 50/12* (2016.02); *H02J 50/40* (2016.02)
(58) Field of Classification Search
  CPC .... H02J 17/00; H02J 5/005; H02J 7/25; H02J 3/01; B60L 11/182; B60L 11/1829; B60L 11/1831; B60L 5/005; Y02T 90/122; H02B 5/0037
  USPC .......................................................... 307/104
  See application file for complete search history.

(56) References Cited

U.S. PATENT DOCUMENTS

| | | | | |
|---|---|---|---|---|
| 6,498,535 | B1* | 12/2002 | Allen et al. .................. | 330/307 |
| 7,421,257 | B1* | 9/2008 | Elliott .............. | H04W 72/1278 455/127.5 |
| 7,816,816 | B2* | 10/2010 | Tanaka ................. | H04B 1/0003 307/131 |
| 7,994,880 | B2* | 8/2011 | Chen ...................... | G08C 17/04 307/104 |
| 2005/0017673 | A1* | 1/2005 | Tsukamoto ........... | H02J 7/0004 320/106 |
| 2005/0018762 | A1* | 1/2005 | Aiello .................. | H04B 1/7183 375/219 |
| 2007/0085696 | A1 | 4/2007 | Ha et al. | |
| 2008/0122297 | A1* | 5/2008 | Arai .............. | 307/154 |
| 2008/0296978 | A1 | 12/2008 | Finkenzeller | |
| 2008/0303479 | A1* | 12/2008 | Park et al. ..................... | 320/108 |
| 2009/0001932 | A1* | 1/2009 | Kamijo .................. | H02J 5/005 320/108 |
| 2009/0140690 | A1* | 6/2009 | Jung ...................... | H02J 7/0044 320/108 |
| 2009/0206165 | A1* | 8/2009 | Laackmann ....... | G06K 19/0707 235/492 |
| 2009/0243397 | A1* | 10/2009 | Cook ..................... | H02J 5/005 307/104 |
| 2009/0261778 | A1* | 10/2009 | Kook ................... | H02J 7/0044 320/108 |
| 2009/0267558 | A1* | 10/2009 | Jung ....................... | H02J 5/005 320/108 |
| 2009/0284082 | A1* | 11/2009 | Mohammadian .... | G06K 7/0008 307/104 |
| 2010/0034238 | A1* | 2/2010 | Bennett .................... | H02J 5/005 375/130 |
| 2010/0181961 | A1* | 7/2010 | Novak .................... | H02J 7/025 320/108 |
| 2010/0207575 | A1* | 8/2010 | Pijnenburg .............. | H02J 7/022 320/108 |
| 2010/0217553 | A1* | 8/2010 | Von Novak .......... | G06K 7/0008 702/65 |
| 2010/0248622 | A1* | 9/2010 | Lyell Kirby ......... | H04B 5/0031 455/41.1 |
| 2010/0277003 | A1* | 11/2010 | Von Novak ............. | H02J 17/00 307/104 |
| 2010/0289341 | A1* | 11/2010 | Ozaki ..................... | H02J 7/025 307/104 |
| 2010/0295378 | A1* | 11/2010 | Suzuki .................... | H02J 7/025 307/104 |
| 2011/0006612 | A1* | 1/2011 | Kozakai .................. | H02J 7/025 307/104 |
| 2011/0127845 | A1* | 6/2011 | Walley .................... | H02J 5/005 307/104 |
| 2011/0127848 | A1* | 6/2011 | Ryu ........................ | H02J 5/005 307/104 |
| 2011/0159812 | A1* | 6/2011 | Kim ..................... | H04B 5/0031 455/41.1 |
| 2011/0198937 | A1* | 8/2011 | Tseng ...................... | H02J 5/005 307/104 |

FOREIGN PATENT DOCUMENTS

| | | |
|---|---|---|
| EP | 2066001 A2 | 6/2009 |
| JP | H03505148 A | 11/1991 |
| JP | H10145987 A | 5/1998 |
| JP | 11110501 A | 4/1999 |
| JP | 2001005923 A | 1/2001 |
| JP | 2009136133 A | 6/2009 |
| JP | 2010028898 A | 2/2010 |
| JP | 2010246292 A | 10/2010 |
| WO | WO-198910030 A1 | 10/1989 |
| WO | WO2007013726 A1 | 2/2007 |
| WO | WO-2008137996 A1 | 11/2008 |
| WO | WO-2010108191 A1 | 9/2010 |

OTHER PUBLICATIONS

International Search Report and Written Opinion—PCT/US2011/065464—ISA/EPO—dated Jun. 6, 2006.
Partial International Search Report—PCT/US2011/065464—ISA/EPO—dated Apr. 10, 2012.

* cited by examiner

WIRELESS POWER PEER TO PEER COMMUNICATION

CLAIM OF PRIORITY UNDER 35 U.S.C. § 119

This application claims priority under 35 U.S.C. § 119(e) to:

U.S. Provisional Patent Application 61/425,202 entitled "WIRELESS POWER PEER TO PEER COMMUNICATION" filed on Dec. 20, 2010, the disclosure of which is hereby incorporated by reference in its entirety.

BACKGROUND

Field

The present invention relates generally to wireless power. More specifically, the present invention relates to methods and devices for communication within a wireless power system.

Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus a rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

In a wireless power system, it may be beneficial for communication between devices to achieve power control for improved system efficiency. For example only, communication may assist in near-field communication (NFC) device detection, rogue receiver detection, and rectifier voltage control. Further, to be compliant with FCC Part 18 regulations, forward link communication in a wireless power system is not allowed, and all reverse links must be passive in terms of load modulation.

Additionally, in order to achieve charge port concurrent continuous charging for multiple devices (e.g., mobile telephones), communication must not interrupt the charging and, therefore, charging and communication should happen concurrently. Moreover, each chargeable devices needs to sync with each other to avoid collision, as there is no forward link to sync the receivers.

A need exists for methods, systems, and devices for enhancing communication between devices within a wireless power system.

SUMMARY OF THE INVENTION

One aspect of the disclosure provides a wireless power receiver configured to receive wireless power from a wireless power transmitter. The wireless power receiver includes a switchable element configured to couple a receive coil to a ground voltage. The wireless power receiver further includes a detector coupled to the receive coil and configured to detect an externally generated pulse.

Another aspect of the disclosure provides an implementation of a method of generating a detectable pulse in a wireless power device. The method includes varying a duty cycle of a power converter of a wireless power device to generate a detectable pulse for communicating with another wireless power device.

Yet another aspect of the disclosure provides a wireless power device. The wireless power device includes a pulse detector coupled to an antenna and configured to detect an externally generated pulse. The pulse detector includes an envelope detector. The pulse detector further includes at least one transistor coupled to the envelope detector and configured to amplify an envelope output from the envelope detector. The pulse detector further includes an output coupled to the at least one transistor and configure to generate a logic output.

Another aspect of the disclosure provides an implementation of a method of communicating a message by a wireless power receiver. The method includes providing power from the wireless power receiver to a chargeable device. The method further includes shorting a receive coil of the wireless power receiver while charging the device.

Another aspect of the disclosure provides an implementation of a method of identifying a wireless power receiver and communicating a power status of the receiver. The method includes transmitting a first message type including an identification of a receiver from the receiver to at least one other receiver. The method further includes incrementing the identification of the receiver if a message received at the receiver is a second message type. The method further includes transmitting a power message and the identification from the receiver to the at least one other receiver.

Another aspect of the disclosure provides an implementation of a method of adjusting the power of a wireless power transmitter. The method includes receiving a rectifier voltage signal from one or more receivers within a charging region of the transmitter. The method further includes adjusting a voltage signal within the transmitter if one of the received rectifier voltage signals is either above a first threshold or below a second threshold.

Another aspect of the disclosure provides a wireless power device. The wireless power device includes means for receiving a rectifier voltage signal from each receiver within a charging region of a transmitter. The wireless power device further includes means for modifying a voltage signal within the transmitter if the received rectifier voltage is either above a first threshold or below a second, threshold.

Another aspect of the disclosure provides a wireless power device. The wireless power device includes means for transmitting a first message type including an identification of a receiver from the receiver to at least one other receiver. The wireless power device further includes means for incrementing the identification of the receiver if a message received at the receiver is a second message type. The wireless power device further includes means for transmitting a power message and the identification from the receiver to the at least one other receiver.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that, is transmitted between a transmitter and a receiver without the use of physical electrical conductors. Hereafter, all three of these will be referred to generically as radiated fields, with the understanding that pure magnetic or pure electric fields do not radiate power. These must be coupled to a "receiving antenna" to achieve power transfer.

Figure 1:
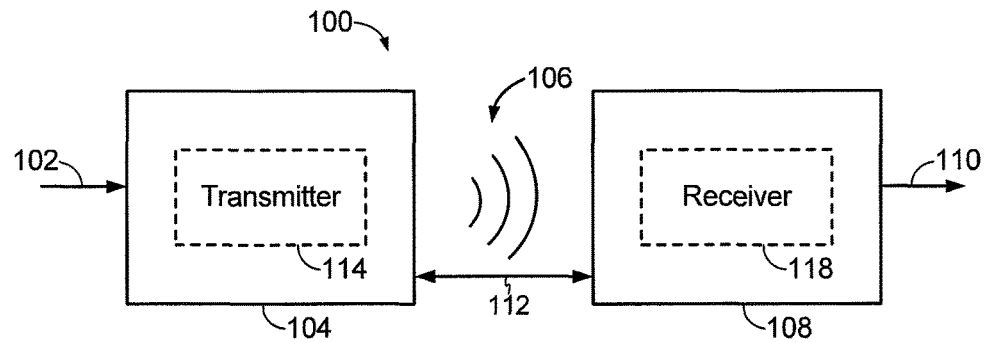
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
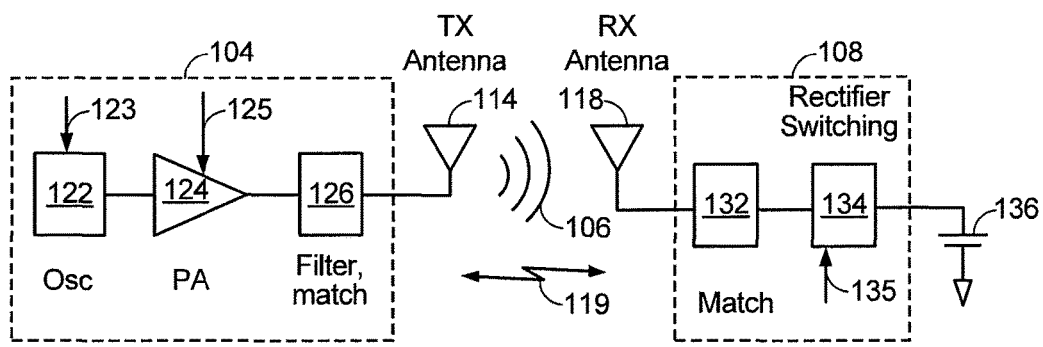
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

As described more fully below, receiver 108, which may initially have a selectively disablable associated load (e.g., battery 136), may be configured to determine whether an amount of power transmitted by transmitter 104 and received by receiver 108 is sufficient for charging battery 136. Further, receiver 108 may be configured to enable a load (e.g., battery 136) upon determining that the amount of power is sufficient.

Figure 3:
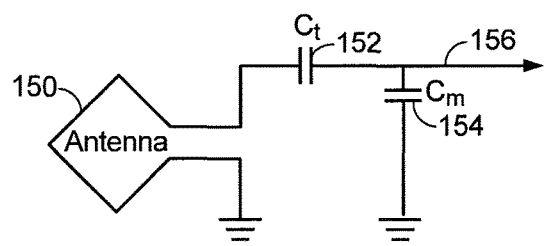
FIG. 3 illustrates a schematic diagram of a loop antenna for use in exemplary embodiments of the present invention.

As illustrated in FIG. 3, antennas used in exemplary embodiments may be configured as a "loop" antenna 150, which may, also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
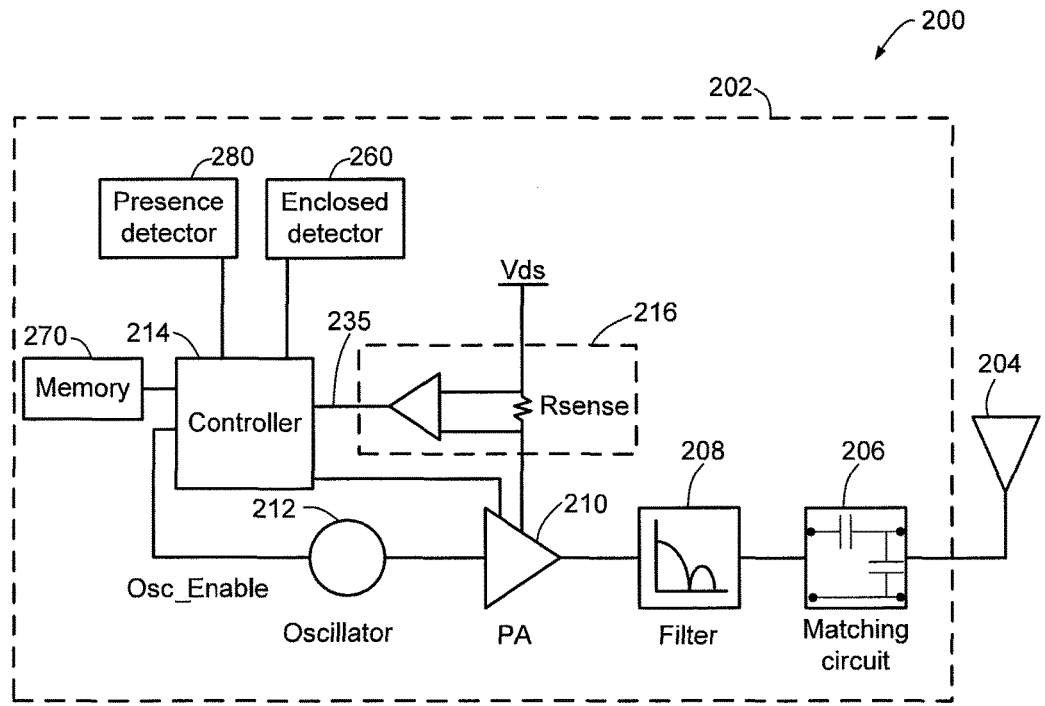
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver. As described more fully below, a current measured at power amplifier 210 may be used to determine whether an invalid device is positioned within a charging region of transmitter 200.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
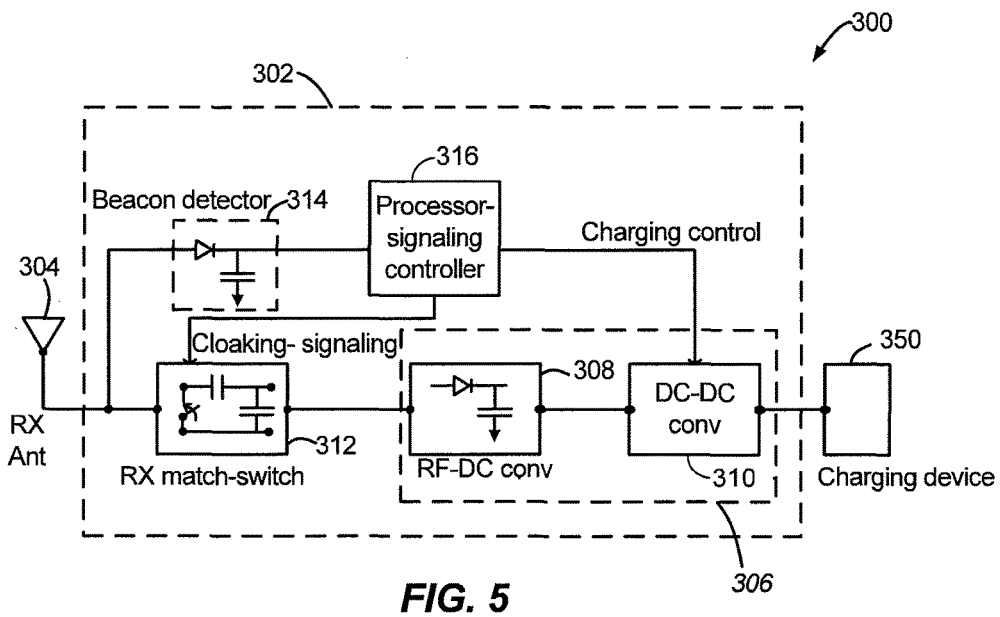
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Exemplary embodiments of the present invention relate to communication in wireless power systems. More specifically, exemplary embodiments relate to communication between multiple receivers in a wireless power system (i.e., peer to peer communication), communication between one or more receivers and a transmitter (e.g., reverse link) in a wireless power system, or a combination thereof.

Figure 6:
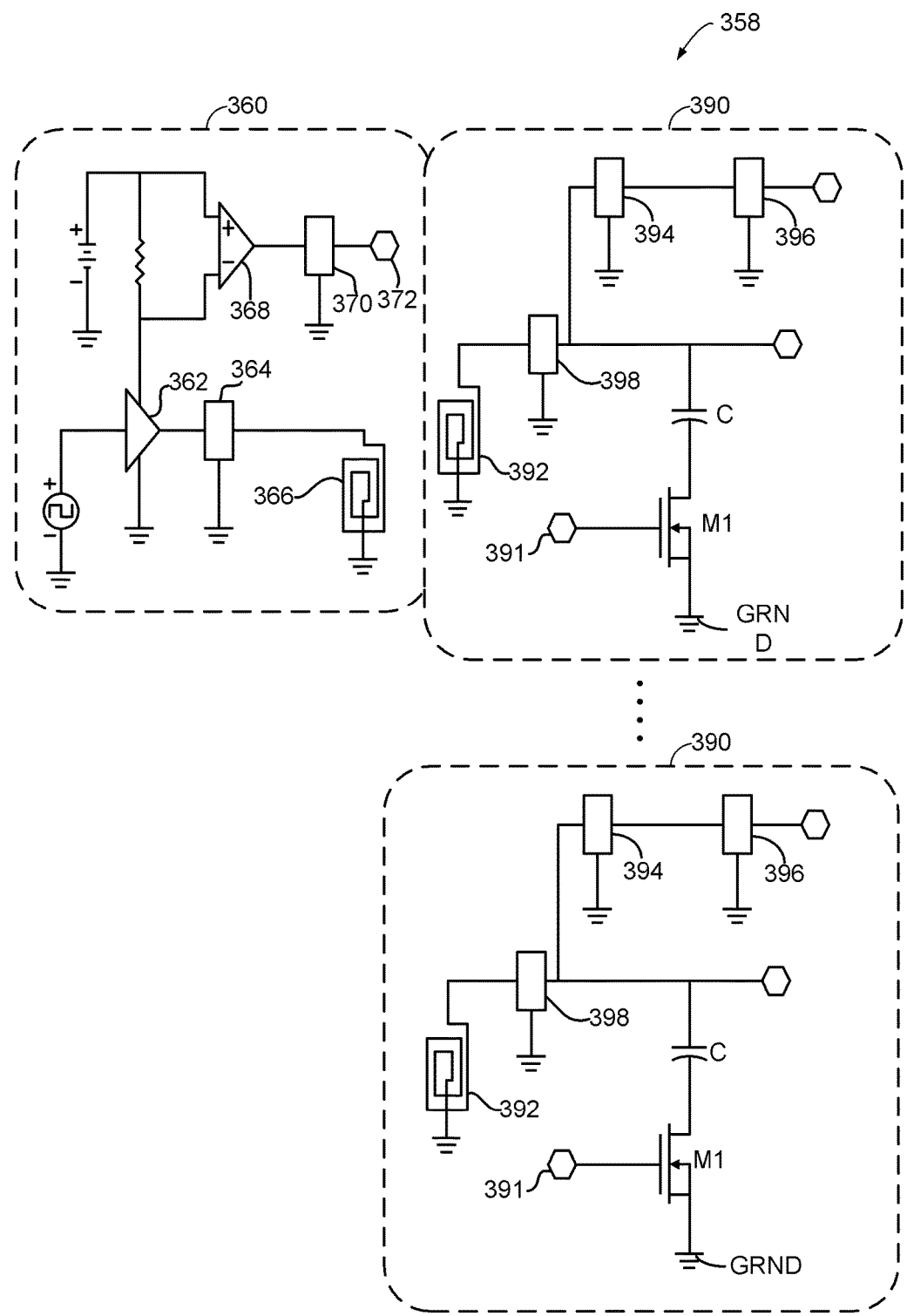
FIG. 6 illustrates a wireless power system including a transmitter and a plurality of receivers, according to an exemplary embodiment of the present invention.

FIG. 6 depicts a wireless power system 358 including a transmitter 360 and one or more receivers 390. Transmitter 360 includes a power amplifier 362, a filter and matching network 364, and a transmit coil 366. Transmitter 360 also includes a current sense amplifier 368, a pulse detector unit 370, and a reverse link port 372. It is noted that pulse detector unit 370 may include a pulse detector (e.g., transmitter pulse detector 750 illustrated in FIG. 12), a pulse stretcher, or both. Moreover, each receiver 390 includes a receive coil 392, a capacitive tap and rectifier 394, a pulse detector unit 396, a filter and matching network 398. Receiver 390 further includes a signaling field-effect transistor (FET) M1 coupled between a capacitor C (e.g., a matching capacitor) and a ground voltage GRND. Further, a gate of FET M1 is coupled to a signaling port 391. It is noted that pulse detector unit 396 may include a pulse detector (e.g., receiver pulse detector 700 illustrated in FIG. 11), a pulse stretcher, or both.

A method of enabling communication from a receiver to a transmitter, from the receiver to other receivers, or both, will now be described. During a contemplated operation, a receiver 390 may send one or more short pulses via signaling port 391. More specifically, receiver 390 may cause, via signaling port 391, signaling FET M1 to conduct and, therefore, couple capacitor C to ground voltage GRND. Stated another way, receive coil 392 may be shorted out. Coupling blocking capacitor C to ground voltage GRND may cause an impedance to be presented on transmit coil 366 of transmitter 360, and may "choke" other receivers within system 358 of power, as power split between receivers is proportional to the impedance presented at transmit coil 366. Moreover, shorting out receive coil 392 may cause a current at power amplifier 362 of transmitter 360 to momentarily increase due to a non-optimal load. Further, each receiver, other than the signaling receiver, may detect a decrease in AC voltage at receiving coil 392 due to the choking caused by the signaling receiver.

Moreover, receiver 390 may include one or more charge holding capacitors, which are used to ride over a short power sag (i.e., due to being "choked" of power), typically not more than 5 μS. Furthermore, it is noted that the pulses should be sufficiently narrow to ensure charging is not interrupted. Pulse stretchers may implemented in both the transmitter and receivers to widen the pulses for ease of detection.

Figure 7:
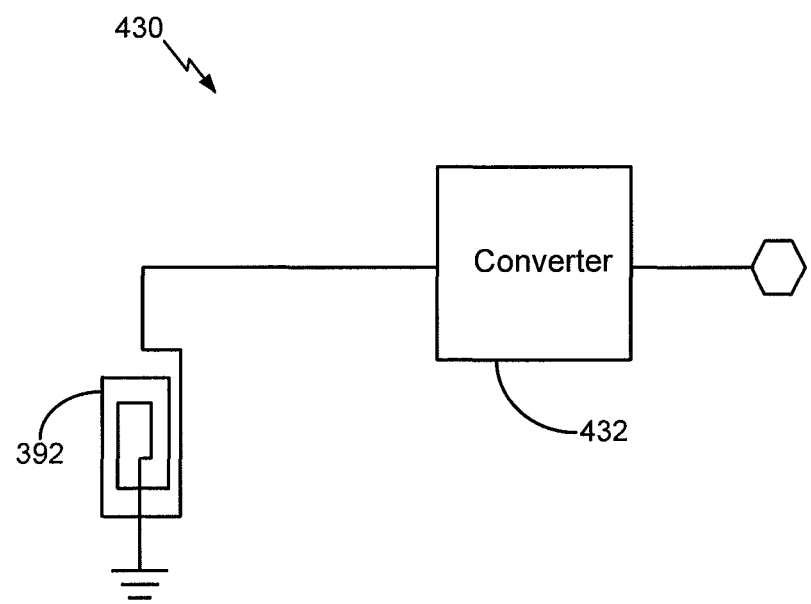
FIG. 7 depicts a wireless power receiver including a converter.

In accordance with another exemplary embodiment, a method of enabling communication from a receiver to a transmitter, from the receiver to other receivers, or both, will now be described. According to an exemplary embodiment of the present invention, a receiver (e.g., receiver 302 of FIG. 5) may communicate with another receiver, a transmitter, or both, by varying a duty cycle of an associated power converter. By varying the duty cycle, an impedance presented to a power amplifier of a transmitter (e.g., power amplifier 210 of FIG. 4) may be modified. By changing the duty cycle of a power converter by adequately small increments, the power delivered remains constant while causing detectable impedance changes at the power amplifier of a transmitter. Further, this may assist in determining optimum impedance operating points. FIG. 7 illustrates a wireless power receiver 430 including receive coil 392 coupled to a power converter 432, which may comprise, for example, a buck converter. Power converter 432 may comprise a switchable element for controlling a duty cycle thereof. By controlling an operation of the switchable element, a duty cycle of power converter 432 may be varied. In response to varying the duty cycle of power converter 432, an impedance at the power amplifier of an associated transmitter (e.g., power amplifier 210 of FIG. 3 or power amplifier 362 of FIG. 6) may be modified to enable for signaling between receiver 430 and the transmitter.

Figure 8:
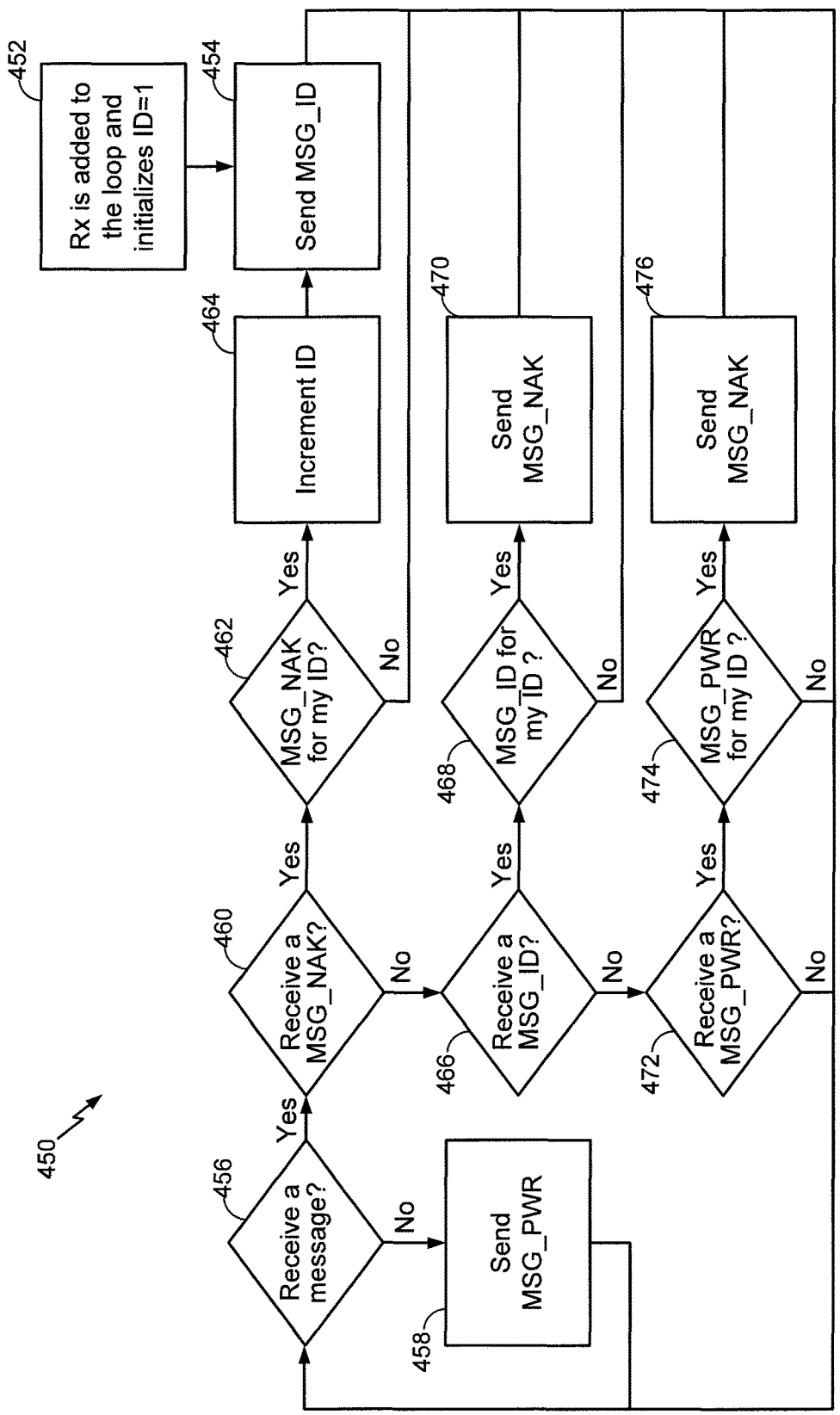
FIG. 8 is a flowchart illustrating a method, in accordance with an exemplary embodiment of the present invention.

To perform peer-to-peer communication with a wireless power system, it may be required to develop a protocol of message types to enable wireless power devices to communicate. FIG. 8 is a flowchart illustrating a method 450, according to an exemplary embodiment. It is noted that method 450 is only an example of a method of messaging between wireless power devices, and other methods may be within the scope of the present invention. Initially, upon being positioned within a charging region of a wireless power transmitter (e.g., transmitter 200 of FIG. 4), a receiver (e.g., receiver 300 of FIG. 5) may initialize to a first identification ("ID") number (e.g., ID=1) (indicated by reference numeral 452). Further, the receiver may transmit an identification message ("MSG_ID") indicative of the ID (indicated by reference numeral 454).

Method 450 may proceed to step 456 wherein it is determined whether the receiver has received a message. If the receiver has not received a message, the receiver may send a power message ("MSG_PWR") indicative of an amount of power received from the transmitter (indicated by reference numeral 458). It is noted that receiver may also transmit a message indicative of a rectifier voltage at the receiver. Messages indicative of an amount of power received, a rectifier voltage, or both, may be transmitted upon a change of the rectifier voltage at the receiver or after a specified time duration (e.g., every three minutes). If, at step 456, the receiver has received a message, it may be determined if the message comprises a negative acknowledgment message ("MSG_NAK") (indicated by reference numeral 460). If it is determined that a negative acknowledgment message "MSG_NAK" has been received, it may then be determined whether the negative acknowledgment message "MSG_NAK" indicates that the previously assigned ID is invalid (i.e., the ID is already in use by another receiver) (indicated by reference numeral 462). If the negative acknowledgment message "MSG_NAK" indicates that the previously assigned ID is invalid, method 450 may proceed to step 464 wherein the receiver may initialize to a second ID, incremented from the first ID (indicated by reference numeral 464). Further, an identification message ("MSG_ID") may be transmitted (indicated by reference numeral 454). If the negative acknowledgment message "MSG_NAK" does not indicate that the previously assigned ID is invalid, method 450 may proceed back to step 456.

Referring back to step 460, if it is determined that the received message does not comprise a negative acknowledgment message ("MSG_NAK"), method 450 may proceed to step 466, where it is determined if the message comprises an identification message ("MSG_ID") for another receiver. If the message comprises an identification message "MSG_ID," method 450 may proceed to step 468 where it is determined if the identification message "MSG_ID" comprises an identification (e.g., a number) equal to an identification for the receiver (indicated by reference numeral 468). Stated another way, at step 468, it may be determined if the identification message "MSG_ID" assigned to the other receiver is already in use by the receiver. If so, the receiver may transmit a negative acknowledgment message ("MSG_NAK") (indicated by reference numeral 470). Method 450 may then revert back to step 456. If it is determined if the identification message "MSG_ID" does not comprise an identification (e.g., a number) equal to an identification for the receiver, method 450 may proceed to step 456.

Referring back to step 466, if it is determined that the received message does not comprise an identification message ("MSG_ID"), method 450 may proceed to step 472, where it is determined if the message comprises a power message ("MSG_PWR"). If the message comprises a power message "MSG_PWR," method 450 may proceed to step 474 where it is determined if the power message "MSG_PWR" is associated with an identification (e.g., a number) equal to an identification for the receiver (indicated by reference numeral 474). Stated another way, at step 474, it may be determined if the power message "MSG_PWR" is associated with an ID that is already in use by the receiver. If so, the receiver may transmit a negative acknowledgment message ("MSG_NAK") (indicated by reference numeral 476). Method 450 may then revert back to step 456. If it is determined if the "MSG_PWR" is not associated with an ID assigned to the receiver, method 450 may proceed to step 456.

Figure 9:
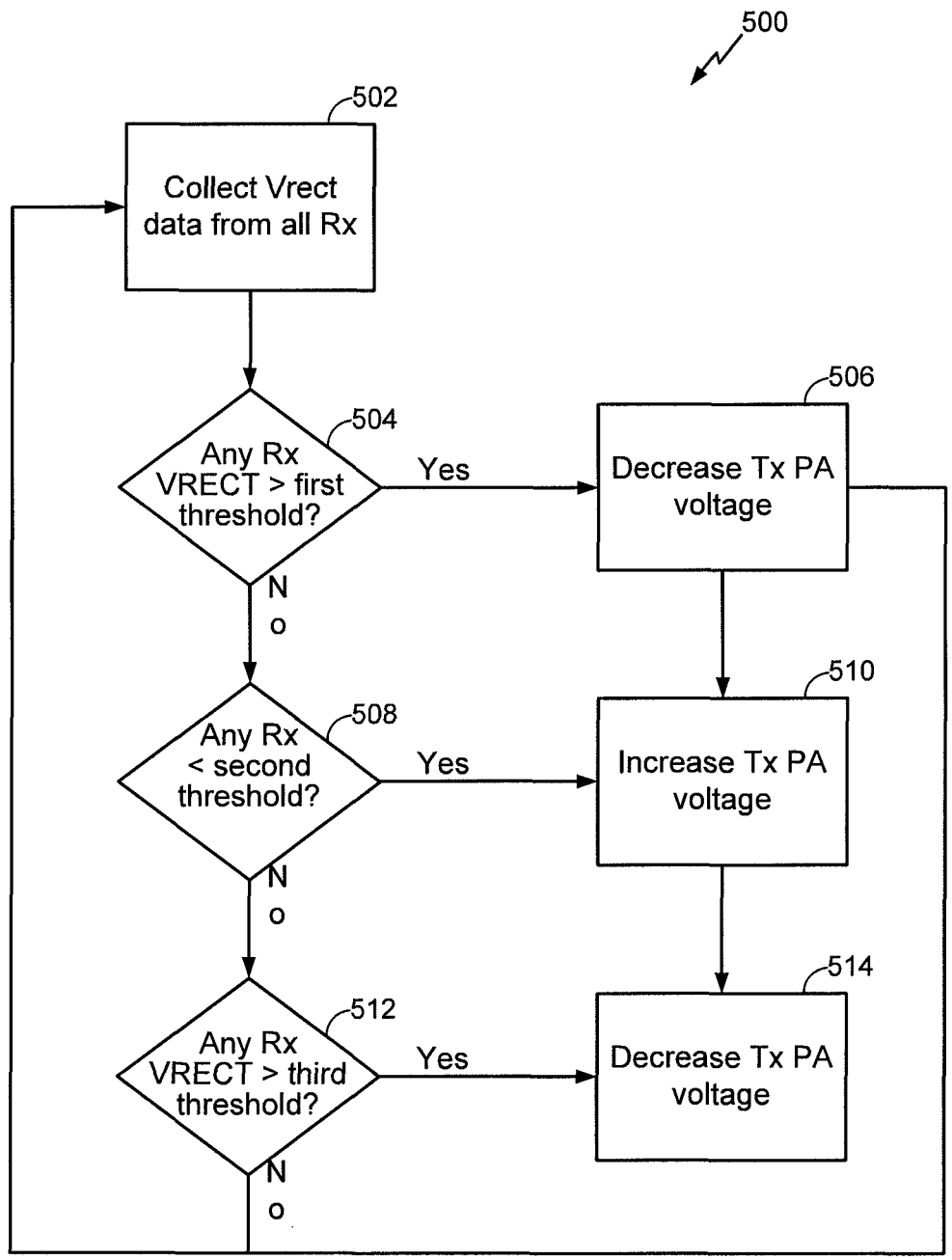
FIG. 9 is a flowchart illustrating another method, in accordance with an exemplary embodiment of the present invention.

FIG. 9 is a flowchart illustrating another method 500, according to an exemplary embodiment. Upon receipt of a power message from each receiver positioned within an associated charging region (indicated by reference numeral 502), a transmitter (e.g., transmitter 200 of FIG. 4) may determine whether a rectifier voltage of any receiver is greater than a first threshold value (indicated by reference numeral 504). If any receiver has a rectifier voltage greater than the first threshold, a voltage at an output a power amplifier (e.g., power amplifier 210 of FIG. 4) of the transmitter may be decreased (indicated by reference numeral 506) and method 500 may return to step 502. If no receiver has a rectifier voltage greater than the first threshold, the transmitter may determine whether a rectifier voltage of any receiver is less than a second threshold value (indicated by reference numeral 508).

If any receiver has a rectifier voltage less than the second threshold, a voltage at an output the power amplifier of the transmitter may be increased (indicated by reference numeral 510) and method 500 may return to step 502. If no receiver has a rectifier voltage less than the second threshold, the transmitter may determine whether a rectifier voltage of any receiver is greater than a third threshold value (indicated by reference numeral 512). If any receiver has a rectifier voltage greater than the third threshold, a voltage at an output the power amplifier of the transmitter may be decreased (indicated by reference numeral 514) and method 500 may return to step 502. By monitoring and regulating the rectifier voltages of receivers within a charging region of a transmitter, system performance may be enhanced. It is noted that every time a receiver sends a power message, all other receivers also send a power message.

Peer-to-peer communication, such as the methods described above with regard to FIGS. 8 and 9, may ensure that unique ID's are assigned to all receivers positioned within a charging region of a transmitter. Further, having a system wherein each receiver includes a unique ID may enable an associated transmitter to determine when it has received power messages from all the participating receivers.

Figure 10:
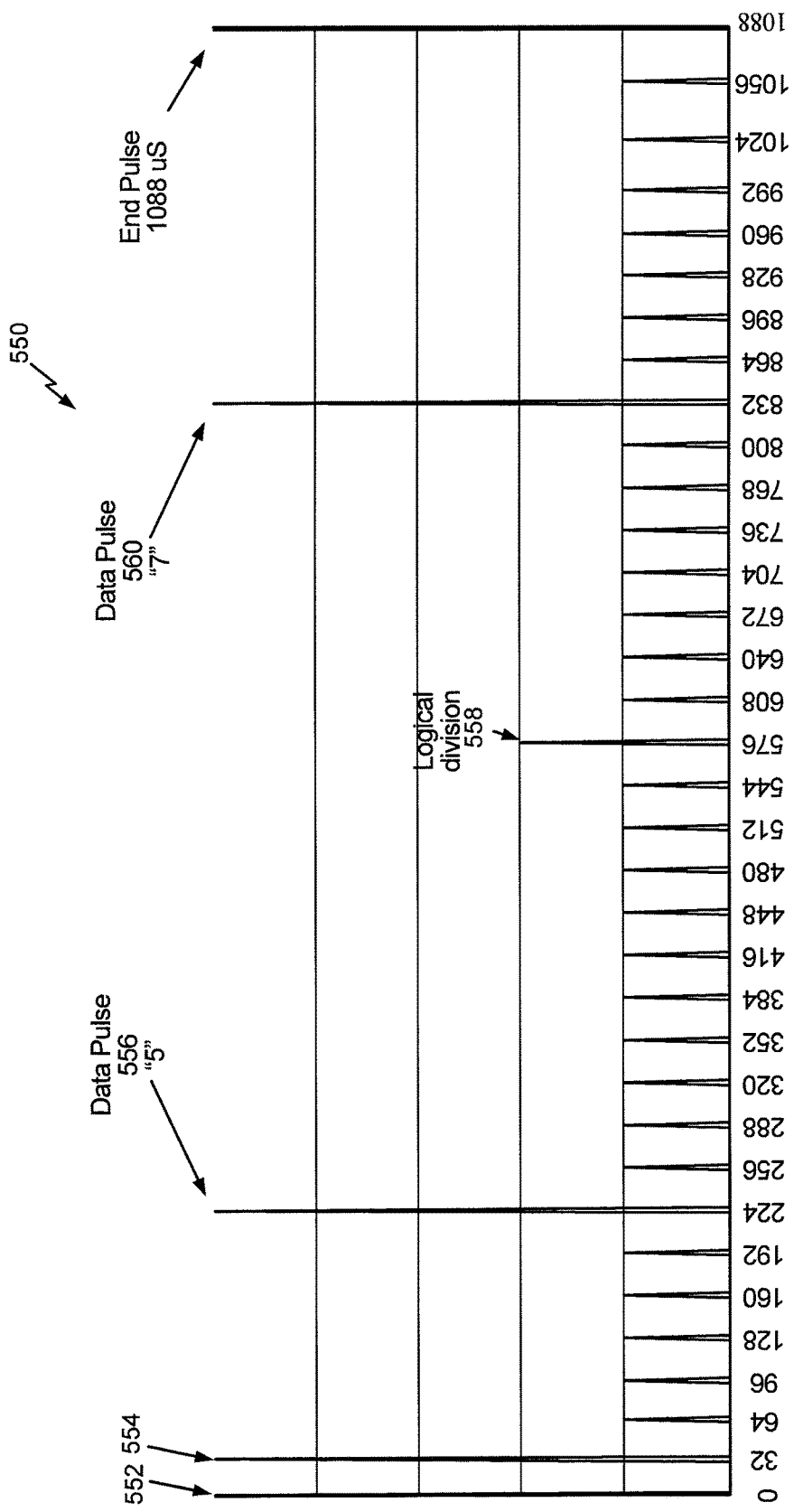
FIG. 10 is a plot depicting a pulse position modulation data signaling method.

One example of data signaling from one receiver to another device (e.g., a transmitter or a receiver) may include pulse position modulation. FIG. 10 is a plot 550 depicting a pulse position modulation data signaling method. Plot 550 includes a plurality of time slots (i.e., time slots 0, 32, 64, . . . 1056, 1088). A signaling method may begin with two pulses 552 and 554 at respective time slots 0 and 32. Further, after start pulses 552 and 554, a first data pulse (i.e., data pulse 556) may be located at one of the next 15 slots (i.e., 0-15) to represent a first data value. In this example, the first data value represents a value of five (5). Moreover, after a logical division slot 558, a second data pulse (i.e., data pulse 560) may be located at one of the next fifteen slots to represent a second data value. In this example, the second data value represents a value of seven (7). Further, the first data value and the second data value may be combined to form a data value (i.e., 75 in the example illustrated in plot 550).

Figure 11:
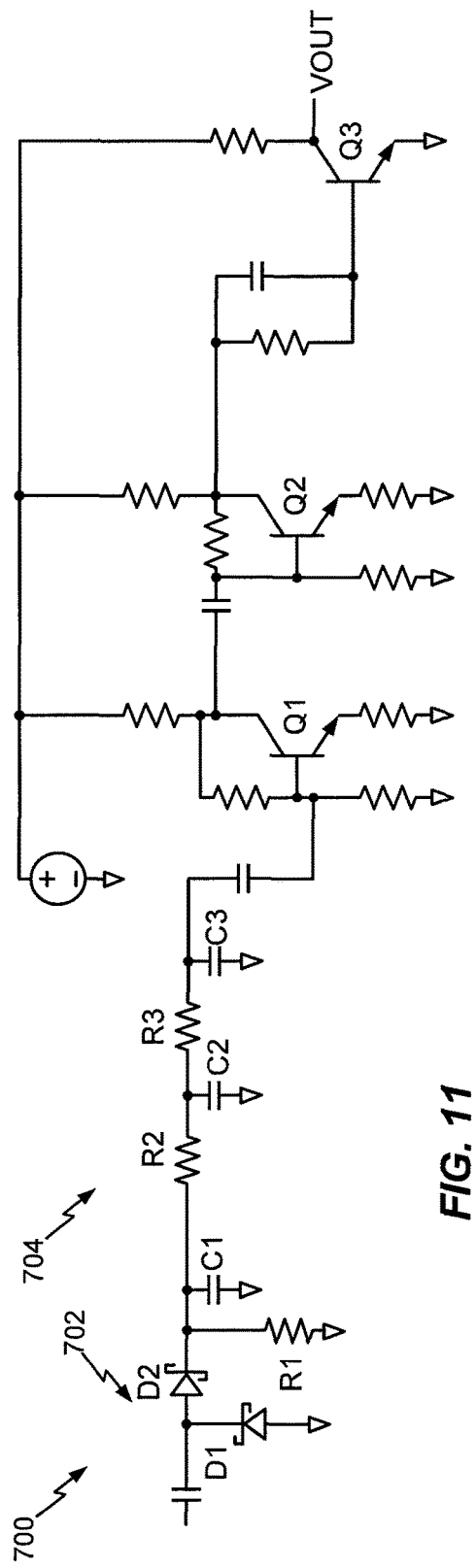
FIG. 11 is a circuit diagram of a receiver pulse detector, according to an exemplary embodiment of the present invention.

FIG. 11 is a circuit diagram of a receiver pulse detector 700, according to an exemplary embodiment of the present invention. Receiver pulse detector 700 includes an envelope detector 702, which includes diodes D1 and D2. Further, pulse detector 700 includes a low-pass filter 704 comprising resistors R1, R2, and R3 and capacitors C1, C2, and C3. Low-pass filter 704 may be configured to remove an RF carrier from a signal output from envelop detector 702. Receive pulse detector 700 further includes transistors Q1, Q2, and Q3, and an output VOUT. It is noted that, for more accurate detection, receiver pulse detector 700 may comprise comparators as an alternative to transistors Q1, Q2, and Q3. An output from low-pass filter 704 may be amplified by transistors Q1 and Q2. Further, an amplified output from transistor Q2 is coupled to transistor Q3, which is normally saturated. A rapid decline in a voltage output from envelope detector 702 may turn off transistor Q3 momentarily, causing the output VOUT to go "high." It is noted that output VOUT may be "high" if an envelope voltage is decreasing. Increases in the envelope voltage, or a constant envelope voltage, may be ignored. For example only, output VOUT may comprise a 0-5V signal suitable for driving a microcontroller interrupt pin. Sudden downward changes in antenna voltage indicate that a receiver is signaling.

Figure 12:
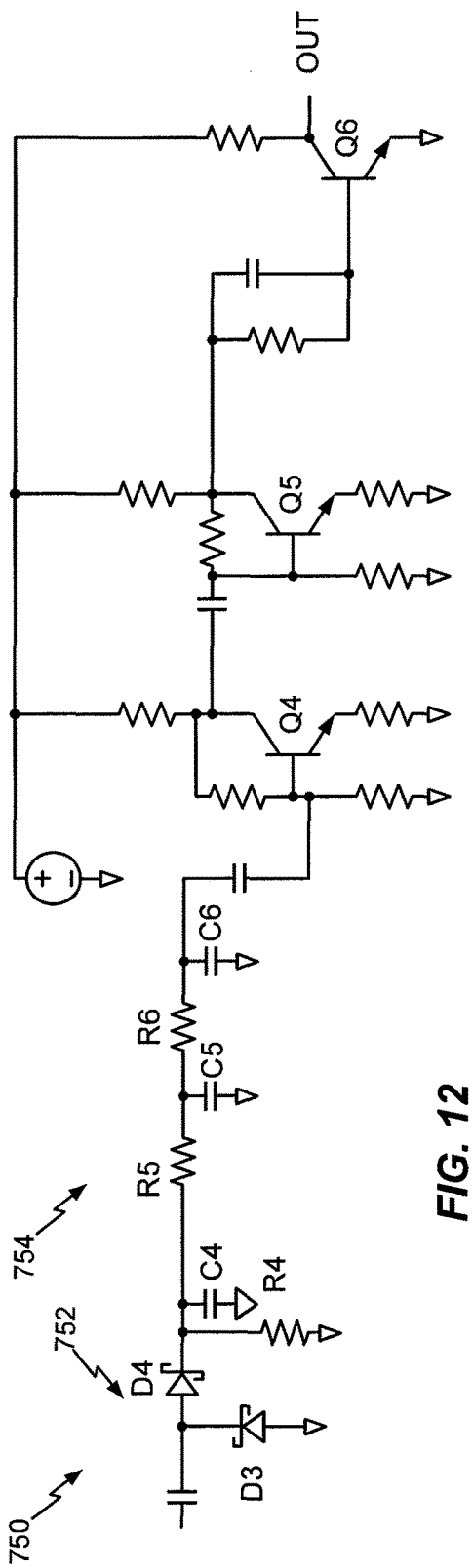
FIG. 12 is a circuit diagram of a transmitter pulse detector, according to an exemplary embodiment of the present invention.

FIG. 12 is a circuit diagram of a transmitter pulse detector 750, according to an exemplary embodiment of the present invention. Receiver pulse detector 750 includes an envelope detector 752, which includes diodes D3 and D4. Further, transmitter pulse detector 750 includes a low-pass filter 754 comprising resistors R4, R5, and R6 and capacitors C4, C5 and C6. Low-pass filter 754 may be configured to remove an RF carrier from a signal output from envelop detector 752. Transmit pulse detector 750 further includes transistors Q4, Q5, and Q6, and an output OUT. It is noted that, for more accurate detection, receiver pulse detector 750 may comprise comparators as an alternative to transistors Q4, Q5, and Q6. An output from low-pass filter 754 may be amplified by transistors Q4 and Q5. Further, an amplified output from transistor Q5 is coupled to transistor Q6, which is normally saturated. A rapid decline a voltage output from envelope voltage 752 may turn off transistor Q6 momentarily, causing the output OUT to go "high." It is noted that output OUT may be "high" if the envelope voltage is decreasing. Increases in envelope voltage, or a constant envelope voltage may be ignored. For example only, output VOUT may comprise a 0-5V signal suitable for driving a microcontroller interrupt pin. Sudden downward changes in antenna voltage indicate that a receiver is signaling. It is noted that receiver pulse detector 700, as illustrated in FIG. 11, and transmitter pulse detector 750, as illustrated in FIG. 12, may comprise different component values.

Figure 13:
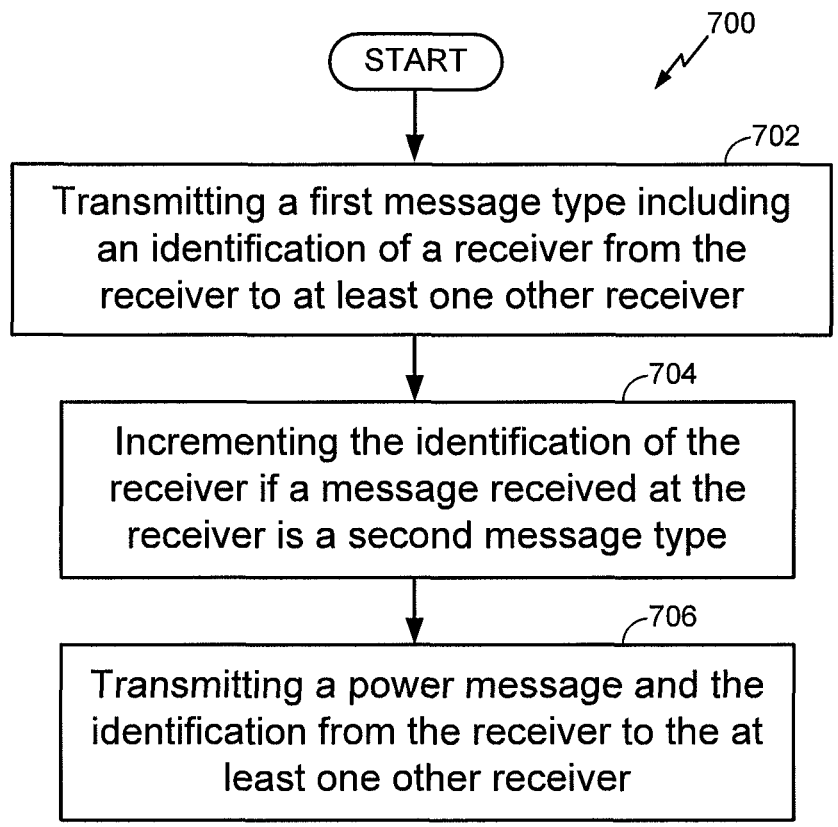
FIG. 13 is a flowchart illustrating another method, in accordance with an exemplary embodiment of the present invention.

FIG. 13 is a flowchart illustrating another method 700, in accordance with one or more exemplary embodiments. Method 700 may include transmitting a first message type including an identification of a receiver from the receiver to at least one other receiver (depicted by numeral 702). Further, method 700 may include incrementing the identification of the receiver if a message received at the receiver is a second message type (depicted by numeral 704). Method 700 may further include transmitting a power message and the identification from the receiver to the at least one other receiver (depicted by numeral 706).

Figure 14:
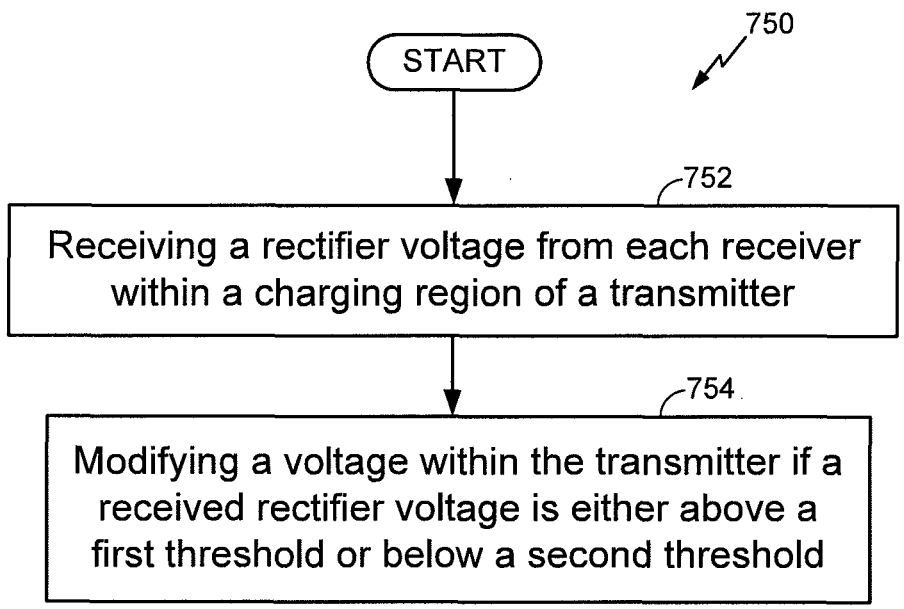
FIG. 14 is a flowchart illustrating another method, in accordance with an exemplary embodiment of the present invention.

FIG. 14 is a flowchart illustrating another method 750, in accordance with one or more exemplary embodiments. Method 750 may include receiving a rectifier voltage from each receiver within a charging region of a transmitter (depicted by numeral 752). Further, method 750 may include modifying a voltage within the transmitter if a received rectifier voltage is either above a first threshold or below a second threshold (depicted by numeral 754).

Figure 15:
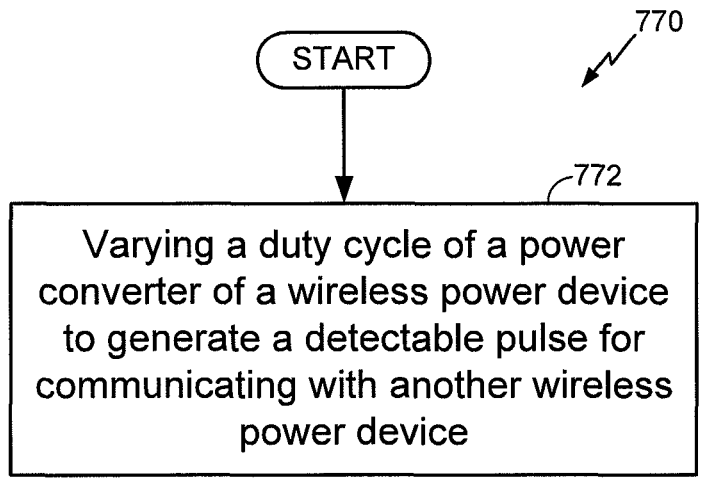
FIG. 15 is a flowchart illustrating another method, in accordance with an exemplary embodiment of the present invention.

FIG. 15 is a flowchart illustrating a method 770, in accordance with one or more exemplary embodiments. Method 770 may include varying a duty cycle of a power converter of a wireless power device to generate a detectable pulse for communicating with another wireless power device. (depicted by numeral 772).

Figure 16:
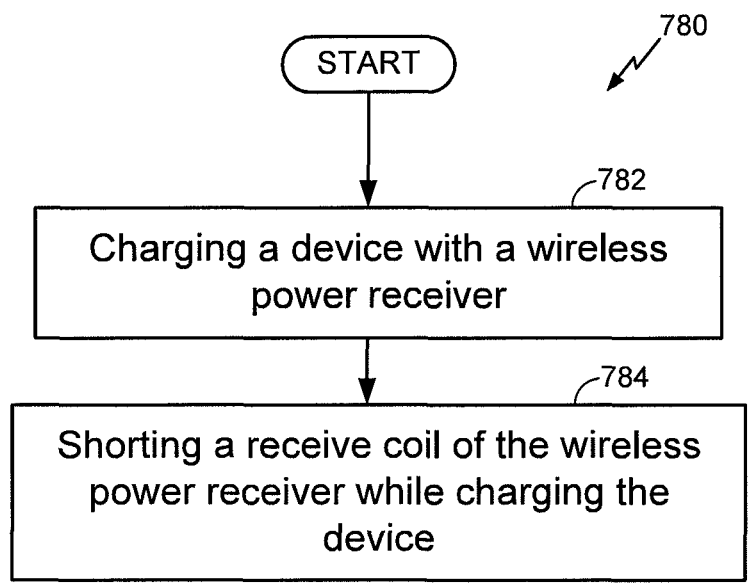
FIG. 16 is a flowchart illustrating yet another method, in accordance with an exemplary embodiment of the present invention.

FIG. 16 is a flowchart illustrating another method 780, in accordance with one or more exemplary embodiments. Method 780 may include charging a device with a wireless power receiver (depicted by numeral 782). Further, method 780 may include shorting a receive coil of the wireless power receiver while charging the device (depicted by numeral 784).

Exemplary embodiments of the invention enable a wireless power system to be FCC Part 18 compliant with little or no added cost, while increasing power handling. Further, exemplary embodiments enable for continuous charging while signaling with little or no charge interruption.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A first wireless power receiver configured to receive wireless power from a wireless power transmitter at a receive coil via a magnetic field generated by the wireless power transmitter, the first wireless power receiver comprising:
   a switchable element configured to cause a first pulse to be generated to a second receiver based on coupling the receive coil to a ground voltage, the first pulse indicating at least a portion of a first message to the second wireless power receiver, wherein the second wireless power receiver receives wireless power via the magnetic field generated by the wireless power transmitter and wherein coupling the receive coil to the ground voltage increases a first amount of power received at the first wireless power receiver from the wireless power transmitter and decreases a second amount of power received at the second wireless power receiver from the wireless power transmitter; and
   a pulse detector coupled to the receive coil and configured to detect a second pulse received from the second wireless power receiver via the magnetic field based on a decrease in power at the receive coil, the second pulse indicating at least a portion of a second message from the second wireless power receiver to the first wireless power receiver.

2. The first wireless power receiver of claim 1, the switchable element comprising a field-effect transistor.

3. The first wireless power receiver of claim 1, further comprising a capacitor coupled between the switchable element and the receive coil.

4. The first wireless power receiver of claim 1, the switchable element coupled to a node positioned between the receive coil and a rectifier.

5. The first wireless power receiver of claim 1, the pulse detector comprising:
   an envelope detector;
   at least one transistor coupled to the envelope detector and configured to amplify an envelope output from the envelope detector; and
   an output coupled to the at least one transistor and configured to generate a logic output.

6. The first wireless power receiver of claim 5, the pulse detector further comprising a filter coupled to an output of the envelope detector and the at least one transistor.

7. The first wireless power receiver of claim 1, further comprising a pulse stretcher coupled between the receive coil and the pulse detector.

8. The first wireless power receiver of claim 1, wherein the second message indicates an amount of power the second wireless power receiver has received from the wireless power transmitter.

9. The first wireless power receiver of claim 1, wherein the second message indicates a rectifier voltage.

10. The first wireless power receiver of claim 1, wherein the second message indicates an identifier used by the second wireless power receiver.

11. The first wireless power receiver of claim 1, wherein the second message indicates a negative acknowledgement.

12. The first wireless power receiver of claim 1, wherein the switchable element is configured to couple the receive coil to the ground voltage to communicate a third message to the wireless power transmitter or the second wireless power receiver.

13. The first wireless power receiver of claim 1, wherein the pulse detector is configured to detect the second message type caused by the second wireless receiver by detecting a decrease in AC voltage at the means for receiving.

14. A first wireless power receiver, comprising:
   an antenna configured to receive wireless power from a wireless power transmitter via a magnetic field generated by the wireless power transmitter;
   a pulse detector coupled to the antenna and configured to detect an externally generated pulse caused by a second wireless power receiver via the magnetic field by detecting a decrease in an amount of wireless power received by the antenna from the wireless power transmitter, the externally generated pulse indicating at least a portion of a message from the second wireless power receiver, and the pulse detector including:
      an envelope detector;
      at least one transistor coupled to the envelope detector and configured to amplify an envelope output from the envelope detector; and
      an output coupled to the at least one transistor and configured to generate a logic output.

15. The first wireless power receiver of claim 14, wherein the envelope detector receives a wireless power signal that is transmitted to a low-pass filter, and wherein the low-pass filter outputs a low-pass signal that is amplified by one of the at least one transistor to saturate another one of the at least one transistor when the second wireless power receiver is not signaling.

16. The first wireless power receiver of claim 14, wherein the logic output is used to determine whether the second wireless power receiver is signaling.

17. A method of communication between a first wireless power receiver to a second wireless power receiver, the method comprising:
   providing power from the first wireless power receiver to a chargeable device, the power being received by a receive coil of the first wireless power receiver via a magnetic field; and
   shorting the receive coil of the first wireless power receiver while charging the chargeable device, to cause a first pulse to be generated to the second wireless power receiver based on coupling the receive coil to a ground voltage, the first pulse indicating at least a portion of a first message to the second wireless power receiver, wherein coupling the receive coil to the ground voltage increases a first amount of power received at the first wireless power receiver from the wireless power transmitter and decreases a second amount of power received at the second wireless power receiver from the wireless power transmitter; and
   detecting a second pulse using a pulse detector coupled to the receive coil based on a decrease in power at the receive coil, the second pulse received from the second wireless power receiver via the magnetic field generated by the wireless power transmitter and indicating at least a portion of a second message from the second wireless power receiver to the first wireless power receiver.

18. The method of claim 17, further comprising charging a storage element with energy received at a receive coil.

19. The method of claim 17, wherein the shorting causes an increase in an impedance at an associated transmit coil.

20. The method of claim 17, wherein the shorting causes a decrease in an AC voltage at receive coils of the second wireless power receiver.

21. A method of identifying a first wireless power receiver and communicating a power status of the first wireless power receiver, comprising:
- transmitting a first message type including an identification number usable to identify the first wireless power receiver from the first wireless power receiver to at least one other wireless power receiver via a magnetic field generated by a wireless power transmitter based on coupling a receive coil of the first wireless power receiver to a ground voltage, wherein coupling the receive coil to the ground voltage increases a first amount of power received at the first wireless power receiver from the wireless power transmitter and decreases a second amount of power received at the second wireless power receiver from the wireless power transmitter;
- adjusting the identification number of the first wireless power receiver in response to receiving a second message type from the at least one other wireless power receiver, the second message type indicating that the identification number is being used by the at least one other wireless power receiver, wherein the second message type is received based on detecting a decrease in power at the receive coil; and
- transmitting a power message and the adjusted identification number from the first wireless power receiver to the at least one other wireless power receiver based on coupling the receive coil of the first wireless power receiver to the ground voltage.

22. The method of claim 21, the adjusting comprising incrementing the identification number of the first wireless power receiver if the second message type received at the first wireless power receiver is a negative acknowledgment in response to transmitting the first message type.

23. The method of claim 21, further comprising transmitting a third message type from the first wireless power receiver if the message received at the first wireless power receiver is a fourth message type.

24. The method of claim 23, the transmitting a third message type comprising transmitting a negative acknowledgment if the fourth message type is associated with an identification number matching the identification number of the first wireless power receiver.

25. The method of claim 21, further comprising transmitting a fifth message type from the first wireless power receiver if the message received at the first wireless power receiver is a sixth message type.

26. The method of claim 25, the transmitting a fifth message type comprising transmitting a negative acknowledgment if the sixth message type is associated with an identification number matching the identification number of the first wireless power receiver.

27. A first wireless power receiver, comprising:
- means for transmitting a first message type including an identification number usable to identify the first wireless power receiver from the first wireless power receiver to at least one other wireless power receiver via a magnetic field generated by a wireless power transmitter based on coupling a means for receiving wireless power of the first wireless power receiver to a ground voltage, wherein coupling the means for receiving to the ground voltage increases a first amount of power received at the first wireless power receiver from the wireless power transmitter and decreases a second amount of power received at the second wireless power receiver from the wireless power transmitter;
- means for adjusting the identification number of the first wireless power receiver in response to receiving a second message type from the at least one other wireless power receiver, the second message type indicating that the identification number is being used by the at least one other wireless power receiver, wherein the second message type is received based on detecting a decrease in power at the means for receiving; and
- means for transmitting a power message and the adjusted identification number from the first wireless power receiver to the at least one other wireless power receiver based on coupling the means for receiving to the ground voltage.

* * * * *